United States Patent
De Andrade et al.

(10) Patent No.: US 11,587,312 B2
(45) Date of Patent: *Feb. 21, 2023

(54) APPARATUSES AND METHODS FOR IDENTIFYING INFRASTRUCTURE THROUGH MACHINE LEARNING

(71) Applicant: AT&T Intellectual Property I, L.P., Atlanta, GA (US)

(72) Inventors: Carlos Eduardo De Andrade, Gainesville, FL (US); Will Adams Culpepper, Hoover, AL (US); Vijay Gopalakrishnan, Edison, NJ (US); Sarat Puthenpura, Berkeley Heights, NJ (US); Weiyi Zhang, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/748,562

(22) Filed: May 19, 2022

(65) Prior Publication Data

US 2022/0277560 A1     Sep. 1, 2022

Related U.S. Application Data

(63) Continuation of application No. 16/722,009, filed on Dec. 20, 2019, now Pat. No. 11,367,277.

(51) Int. Cl.
*G06V 20/10*     (2022.01)
*G06Q 30/02*     (2012.01)
*G06K 9/62*      (2022.01)
*G06Q 30/0283*   (2023.01)

(52) U.S. Cl.
CPC .......... *G06V 20/176* (2022.01); *G06K 9/628* (2013.01); *G06K 9/6256* (2013.01); *G06Q 30/0283* (2013.01); *G06V 2201/10* (2022.01)

(58) Field of Classification Search
CPC ............ G06V 20/176; G06V 2201/10; G06K 9/6256; G06K 9/628; G06Q 30/0283
See application file for complete search history.

(56) References Cited

U.S. PATENT DOCUMENTS

| | | |
|---|---|---|
| 9,129,355 B1 | 9/2015 | Harvey et al. |
| 2011/0225151 A1 | 9/2011 | Annambhotla et al. |
| 2021/0192210 A1 | 6/2021 | De Andrade et al. |

FOREIGN PATENT DOCUMENTS

KR     20150022587 A     3/2015

*Primary Examiner* — Casey L Kretzer
(74) *Attorney, Agent, or Firm* — Guntin & Gust, PLC; Robert Gingher

(57) ABSTRACT

Aspects of the subject disclosure may include, for example, obtaining a first plurality of inputs that identify a plurality of geographical locations and a plurality of infrastructure located at the plurality of geographical locations, classifying each of the plurality of geographical locations in accordance with the first plurality of inputs to obtain a plurality of classes, obtaining a second plurality of inputs that identify costs, revenue, profits, or any combination thereof, associated with the plurality of infrastructure, processing the second plurality of inputs in conjunction with the plurality of classes to identify a first plurality of locations included in the plurality of geographical locations to decommission infrastructure included in the plurality of infrastructure, and presenting the first plurality of locations via a device. Other embodiments are disclosed.

20 Claims, 7 Drawing Sheets

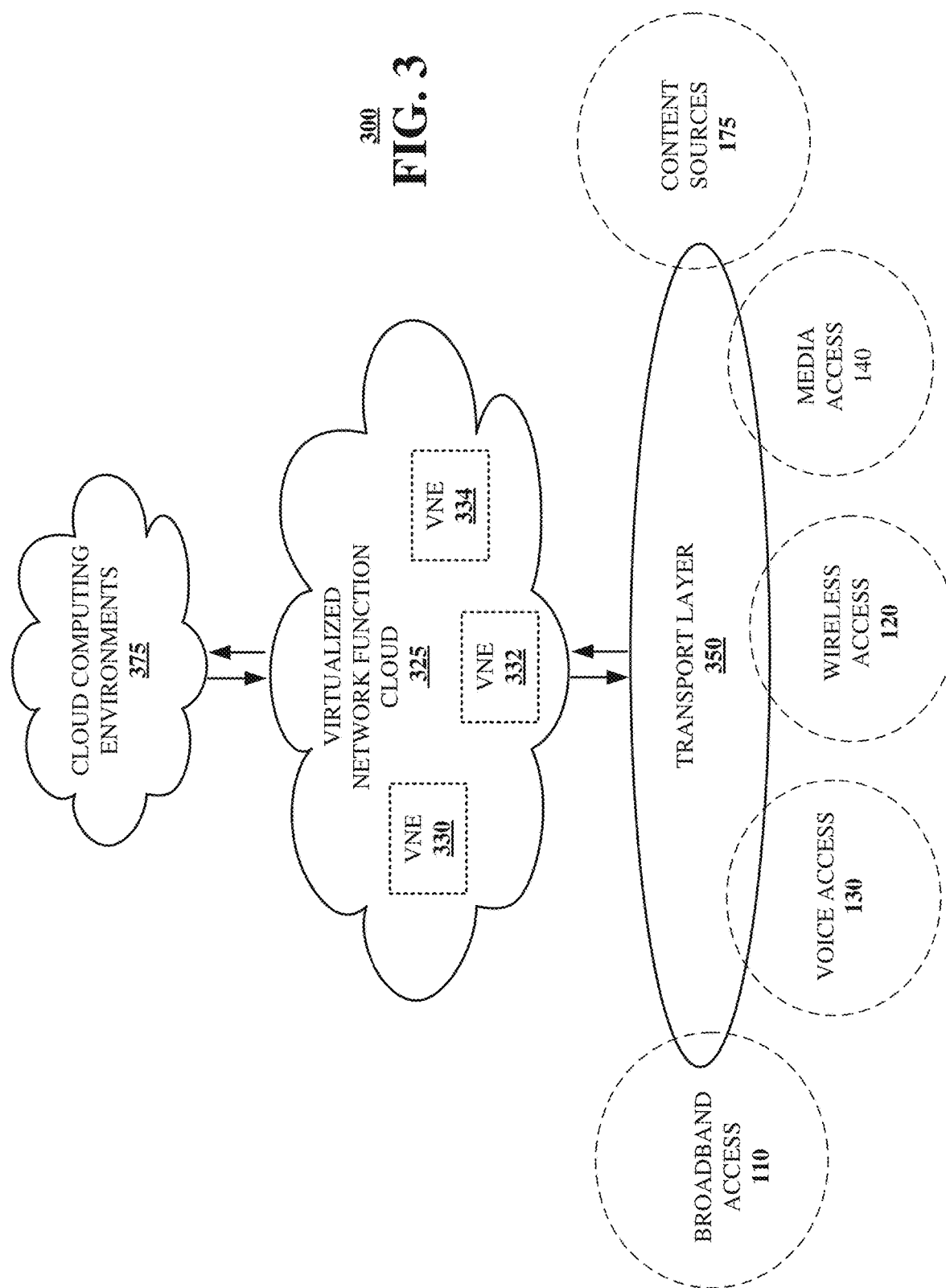

APPARATUSES AND METHODS FOR IDENTIFYING INFRASTRUCTURE THROUGH MACHINE LEARNING

CROSS REFERENCE TO RELATED APPLICATIONS

This application is a continuation of U.S. patent application Ser. No. 16/722,009 filed on Dec. 20, 2019. All sections of the aforementioned application are incorporated by reference herein in their entirety.

FIELD OF THE DISCLOSURE

The subject disclosure relates to apparatuses and methods for identifying infrastructure through machine learning.

BACKGROUND

As the world becomes increasingly connected over vast communication systems and networks, the costs associated with provisioning and maintaining the systems/networks continue to escalate. For example, network resources may need to be provisioned/allocated to ensure that a sufficient quality of service (QoS) is maintained when presented with increasing or dynamic loads represented by new users/subscribers.

In an effort to keep costs under control, a network operator or service provider may desire to decommission infrastructure (poles, wires/cables, transmitters/receivers, processing equipment, etc.). For example, the network operator/service provider may license or rent the use of such infrastructure as part of providing service. Depending on the nature of the user/subscriber footprint in a given area/region, it might not be economically viable/prudent to continue licensing/renting the use of such infrastructure in the given area/region. However, data regarding such infrastructure is frequently incomplete/faulty. For example, a service address associated with a user/subscriber may be different from a billing address associated with the user/subscriber (e.g., a third party located at the billing address may process a billing statement on behalf of the user/subscriber). If the network operator/service provider fails to account for this distinction in terms of service versus billing location, the network operator/service provider may falsely believe that the user/subscriber is located at the billing address. Still further, due to a variety of factors such as maintenance, the use of legacy databases, etc., data regarding a location of given infrastructure (as well as an identification of a type of infrastructure at a given location) may be incomplete or may become stale over time.

In view of the foregoing considerations, it is challenging to identify infrastructure to decommission/retire. For example, conventional techniques rely on a process whereby personnel visually inspect a given area/region using geographical information systems (GISs), such as mapping applications. Such a process is manual/laborious (and hence, time-consuming and expensive) and is susceptible to human error. In this regard, conventional techniques are inadequate/sub-optimal in terms of an identification of infrastructure to decommission.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for identifying resources (e.g., infrastructure) to decommission and/or deploy in association with a network (e.g., a communication network) or a system (e.g., a communication system) in one or more geographical locations. Other embodiments are described in the subject disclosure.

One or more aspects of the subject disclosure include obtaining a first plurality of inputs that identify a plurality of geographical locations, wherein the first plurality of inputs includes a map, a satellite image, an aerial image, an image included on a social media platform, or any combination thereof, processing the first plurality of inputs to obtain a geocoding of the plurality of geographical locations, classifying each of the plurality of geographical locations in accordance with the geocoding to obtain a plurality of classes, obtaining a second plurality of inputs that identify costs associated with a plurality of infrastructure located at the plurality of geographical locations, processing the second plurality of inputs in conjunction with the plurality of classes to generate a list of locations included in the plurality of geographical locations to decommission infrastructure included in the plurality of infrastructure, and presenting the list, a modified list corresponding to a modification of the list, or a combination thereof, on an output device.

One or more aspects of the subject disclosure include obtaining a first plurality of inputs that identify a plurality of geographical locations and a plurality of infrastructure located at the plurality of geographical locations, classifying each of the plurality of geographical locations in accordance with the first plurality of inputs to obtain a plurality of classes, obtaining a second plurality of inputs that identify costs, revenue, profits, or any combination thereof, associated with the plurality of infrastructure, processing the second plurality of inputs in conjunction with the plurality of classes to identify a first plurality of locations included in the plurality of geographical locations to decommission infrastructure included in the plurality of infrastructure, and presenting the first plurality of locations via a device.

One or more aspects of the subject disclosure include obtaining at least one map corresponding to at least one geographical area where network infrastructure is located, processing at least the at least one map to classify the at least one geographical area, resulting in a class, identifying a cost associated with the network infrastructure in accordance with the class, determining that the network infrastructure is to be decommissioned in accordance with the cost, and generating an output that indicates that the network infrastructure is recommended to be decommissioned responsive to the determining.

Figure 1:
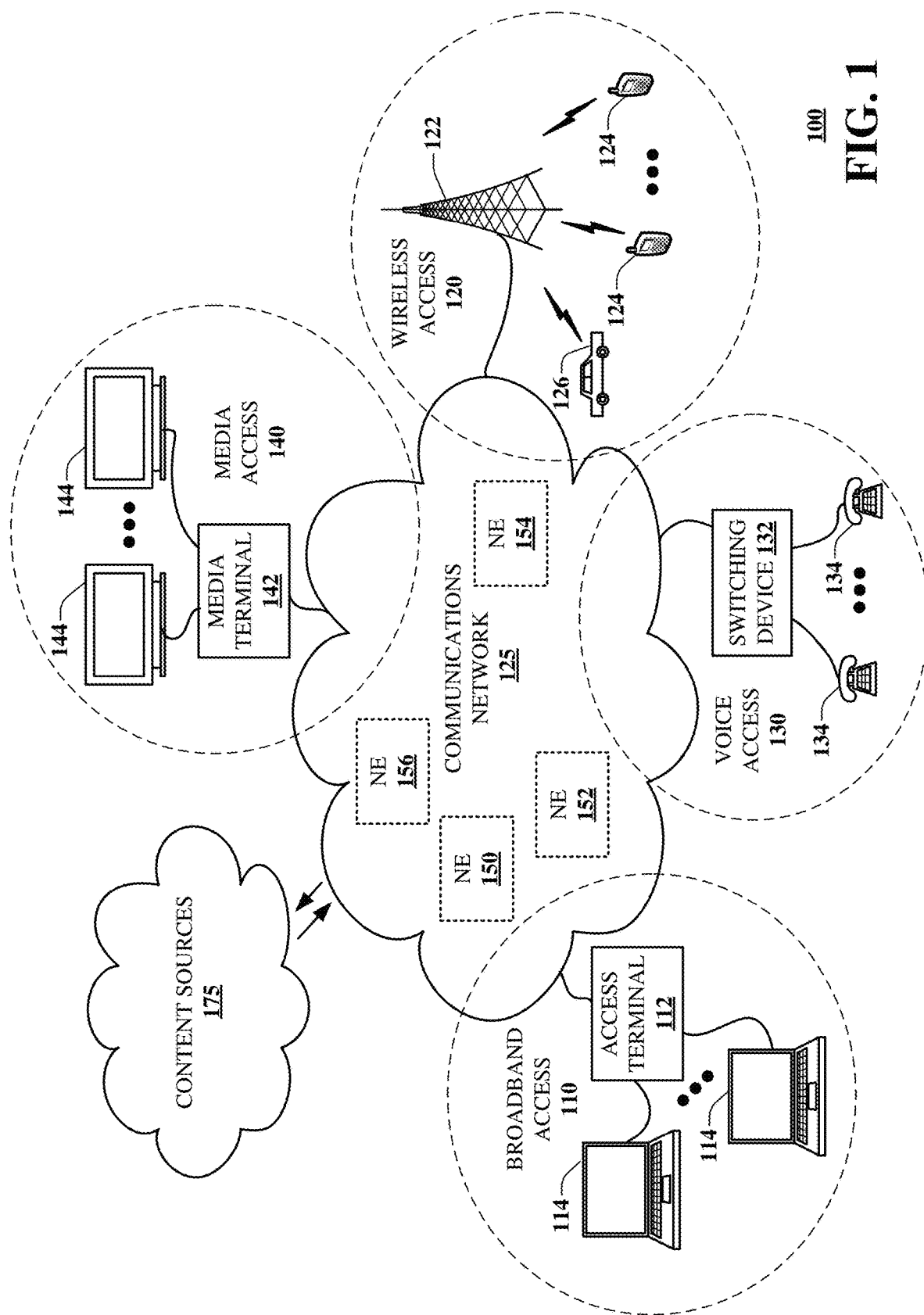
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part obtaining a first plurality of inputs that identify a plurality of geographical locations, wherein the first plurality of inputs includes a map, a satellite image, an aerial image, an image included on a social media platform, or any combination thereof, processing the first plurality of inputs to obtain a geocoding of the plurality of geographical locations, classifying each of the plurality of geographical locations in accordance with the geocoding to obtain a plurality of classes, obtaining a second plurality of inputs that identify costs associated with a plurality of infrastructure located at the plurality of geographical locations, processing the second plurality of inputs in conjunction with the plurality of classes to generate a list of locations included in the plurality of geographical locations to decommission infrastructure included in the plurality of infrastructure, and presenting the list, a modified list corresponding to a modification of the list, or a combination thereof, on an output device. Communications network 100 can facilitate in whole or in part obtaining a first plurality of inputs that identify a plurality of geographical locations and a plurality of infrastructure located at the plurality of geographical locations, classifying each of the plurality of geographical locations in accordance with the first plurality of inputs to obtain a plurality of classes, obtaining a second plurality of inputs that identify costs, revenue, profits, or any combination thereof, associated with the plurality of infrastructure, processing the second plurality of inputs in conjunction with the plurality of classes to identify a first plurality of locations included in the plurality of geographical locations to decommission infrastructure included in the plurality of infrastructure, and presenting the first plurality of locations via a device. Communications network 100 can facilitate in whole or in part obtaining at least one map corresponding to at least one geographical area where network infrastructure is located, processing at least the at least one map to classify the at least one geographical area, resulting in a class, identifying a cost associated with the network infrastructure in accordance with the class, determining that the network infrastructure is to be decommissioned in accordance with the cost, and generating an output that indicates that the network infrastructure is recommended to be decommissioned responsive to the determining.

As shown in FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
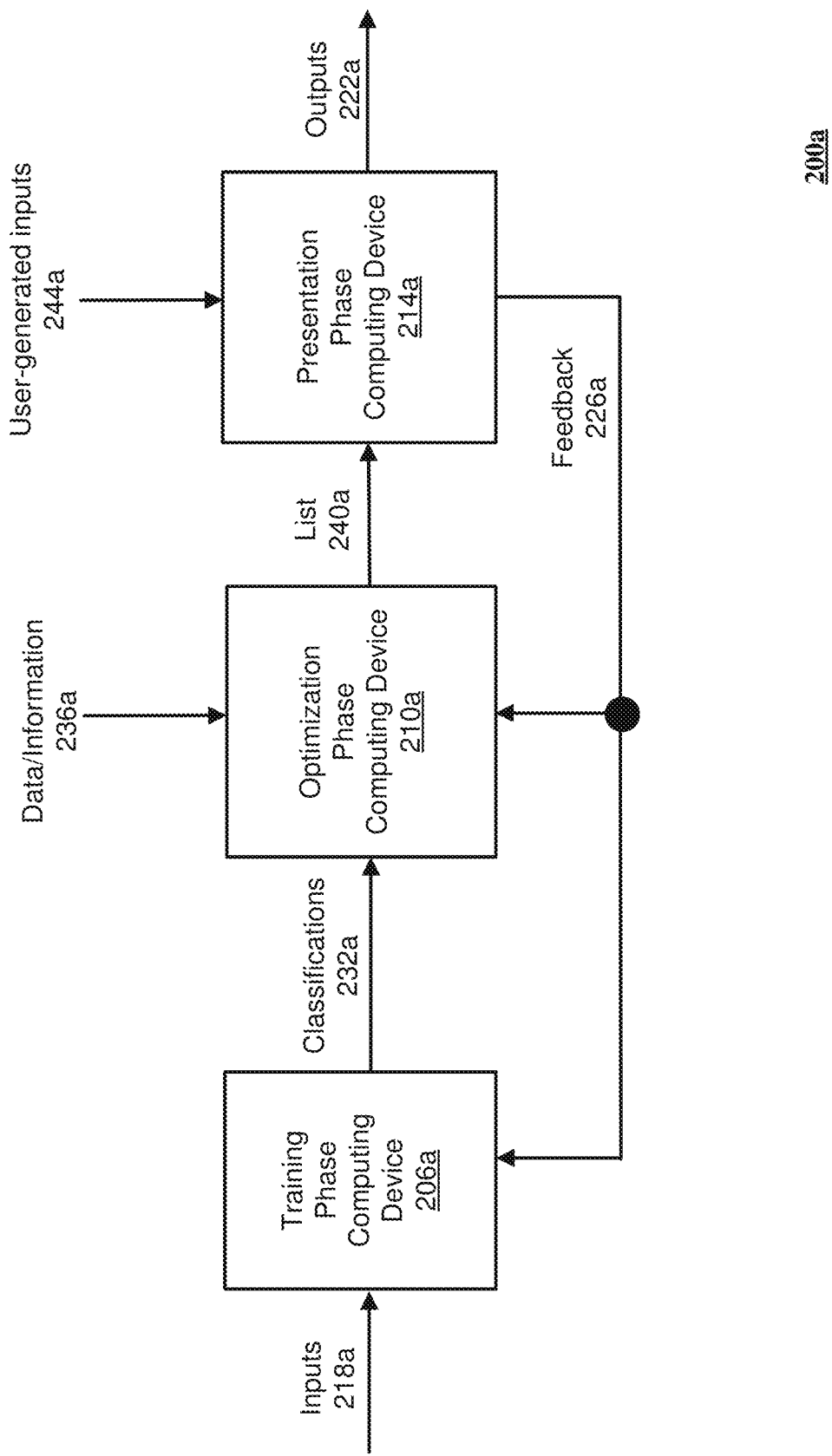
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within, or operatively overlaid upon, the communication network 100 of FIG. 1 in accordance with various aspects described herein. The system 200a may include one or more computing devices, such as for example a first training phase computing device 206a, a second optimization phase computing device 210a, and a third presentation phase computing device 214a. The role/functionality associated with each of the computing devices 206a through 214a is described in further detail below.

While the computing devices 206a through 214a are shown separately (potentially as part of a distributed computing/processing environment) in FIG. 2A, in some embodiments two or more of the computing devices 206a through 214a may be located within a common device/housing. In some embodiments, the system 200a may be arranged as part of a peer-to-peer network, where a first of the computing devices (e.g., the computing device 206a) may be a peer of a second of the computing devices (e.g., the computing device 210a). Still further, in some embodiments aspects of the system 200a may be implemented in accordance with a server-client architecture. In this respect, the computing devices 206a and 210a may be incorporated/included as part of one or more servers and the computing device 214a may be incorporated/included as part of one or more client devices or user equipment (UEs).

The system 200a (e.g., the computing device 206a) may obtain (e.g., receive) one or more inputs (e.g., inputs 218a). The system 200a may process the inputs 218a to generate one or more outputs (e.g., outputs 222a). Still further, the system 200a (e.g., the computing device 214a) may generate/obtain/provide feedback 226a. The feedback 226a (which may correspond to a portion of the outputs 222a in some embodiments) may be provided to the computing device 206a and/or the computing device 210a for purposes of refining/enhancing an accuracy in the outputs 222a as described in further detail below.

In some embodiments, the inputs 218a may include maps. The maps may be obtained (e.g., received) from one or more (third-party) mapping providers, may be distributed via one or more networks or platforms, and/or may be captured using image capture technology (e.g., satellite or aerial imaging equipment, imagery obtained via one or more social media networks/platforms, etc.). In some embodiments, the inputs 218a may include census data that may identify a location (e.g., an address or residence) of a given person. In some embodiments, the inputs 218a may include public data, such as information regarding tax rolls in a given area/jurisdiction, publications of death (e.g., obituaries, death certificates, etc.), news reports, public utility information, etc. In some embodiments, the inputs 218a may include information that is local/proprietary to a service operator/network provider, such as for example an identification of network/drop line topologies, identifications of subscribers/users (past or present), etc.

The computing device 206a may process the inputs 218a to generate one or more geocodes. In this respect, the computing device 206a may execute one or more geocoding algorithms to transform physical addresses identified in conjunction with the inputs 218a to locations on the Earth's surface, where the locations may be specified as a spatial representation in numerical or other coordinates.

The inputs 218a and/or the geocodes may be incorporated as part of one or more models developed and/or maintained at the computing device 206a. For example, the models may include deep neural networks, support vector machines (SVMs), random forests/random decision forests, and any kind or type of machine learning algorithm/device. The models, once trained, may be able to classify new addresses or geocodes that are provided to the system 200a, potentially as part of (future instances of) the inputs 218a.

In some embodiments, the models of the computing device 206a may be used to generate classifications 232a of various areas/regions. For example, in some embodiments the models may classify a given area/region as being an urban area/region or a rural area/region (e.g., a park such as a national park). Other forms/grades/types of classification may be used in some embodiments, such as for example a selection corresponding to rural, suburban, or urban.

From the perspective of a network operator/service provider and operating under an assumption of all other conditions being equal, a rural area/region may represent a better candidate for purposes of decommissioning/retiring infrastructure located therein relative to a suburban area/region. Similarly, a suburban area/region may represent a better candidate for purposes of decommissioning/retiring infrastructure located therein relative to an urban area/region (again, operating under an assumption of all other conditions being equal).

The classifications 232a generated by (the models of) the computing device 206a may serve as inputs to the computing device 210a. The classified areas/regions embodied within the classifications 232a may be combined with data/information 236a (where the data/information 236a may be included as part of the inputs 218a in some embodiments) at the computing device 210a to generate a list 240a (e.g., a priority listing) of recommended areas/regions for a decommissioning of infrastructure. The data/information 236a may include an identification of actual or estimated infrastructure costs, such as for example maintenance costs, pole rental/licensing costs, costs associated with transporting service personnel to an area/region where the infrastructure is located, etc. The data/information 236a may include a specification of actual and/or estimated revenue or profits attributable to the infrastructure.

The recommendations embodied in the list 240a may be provided (e.g., transmitted) to the computing device 214a. Upon obtaining the list 240a, the computing device 214a may store the list 240a in a storage device (e.g., a memory, a database, etc.) included in, or coupled/accessible to, the computing device 214a. In some embodiments, the computing device 214a may present the list 240a as the outputs 222a in accordance with/via an output capability/device, e.g., a speaker, a display screen/device, a print-out, an electronic report or message, etc. In some embodiments, the computing device 214a may process the list 240a and may present recommendations associated therewith as the outputs 222a in a format where the recommendations are overlaid on top of representations of locations on a map (or other representation of one or more given geographical areas/regions). In some embodiments, the computing device 214a may apply special effects (e.g., highlighting, color-coding, an assignment/indication of a numerical ranking, shapes, symbols, etc.) to the recommendations in presenting the outputs 222a to emphasize, or otherwise distinguish, those areas/regions that are recommended for infrastructure decommissioning (relative to other areas/regions that aren't recommended for infrastructure decommissioning). In some embodiments, the recommendations may be presented by the computing device 214a as the outputs 222a in accordance with a global positioning system (GPS) and/or a navigation system to facilitate directions for transporting personnel and/or equipment to a given site for purposes of decommissioning infrastructure. In some embodiments, the recommendations may be provided as part of a fleet of autonomous vehicles in order to transport the personnel and/or equipment in accordance with a work/maintenance schedule. In some embodiments, the computing device 214a may provide instructions (e.g., a tutorial, such as a video tutorial) as the outputs 222a in conjunction with the recommendations that describe techniques (e.g., tools, techniques/methods/best-practices, etc.) for decommissioning the infrastructure.

In some embodiments, the computing device 214a may obtain (e.g., receive) one or more user-generated inputs 244a that cause a recommendation included in the list 240a to be modified in presenting the outputs 222a. For example, a user-generated input 244a may re-order a relative priority between a first area/region and a second area/region for purposes of decommissioning infrastructure located in the respective areas/regions. In some embodiments, the computing device 214a may accept/process the user-generated input 244a on the basis of a user or device providing a credential that may be validated/verified by the computing device 214a. In this manner, in some embodiments a modification of the listing 240a (or recommendations associated therewith) in presenting the outputs 222a may be limited to a subset of (authorized) users or devices.

While represented as a user-generated input 244a in FIG. 2A, in some embodiments the input 244a may correspond to an occurrence of an event or a condition. For example, a mass exodus of users/subscribers in a given area (such as for example due to an occurrence of a natural disaster rendering the area "unlivable" or "uninhabitable") may trigger a re-ordering of priorities in terms of decommissioning infrastructure in the given area. In this respect, the input 244a may encapsulate/include an identification of an occurrence of such events or conditions.

As described above, the computing device 214a may generate feedback 226a that may be provided to the computing device 206a and/or the computing device 210a. The feedback 226a may be based at least in part on the input 244a. In some embodiments, the feedback 226a may be based at least in part on a user response to a survey.

In some embodiments, the feedback 226a may indicate any errors in recommendations incorporated in the list 240a that may have been caused by an error/inaccuracy in the models of the computing device 206a and/or an error/inaccuracy in the data/information 236a processed by the computing device 210a. In this respect, the feedback 226a may be used by the system 200a as a corrective mechanism in order to refine/enhance the accuracy of parameters or data associated with the computing device 206a and/or the computing device 210a. Stated slightly differently, the parameters/data used in the system 200a may be dynamic in nature, and may adapt to changing events, circumstances, or conditions over time. In this regard, parameters, data, and models of the system 200a may be referred to as being "living" or "live" in nature, whereby the parameters, data, and models may incorporate aspects of machine learning and artificial intelligence in order to adapt over time.

In view of the foregoing, one skilled in the art will appreciate that continued use of the system 200a may cause any errors in the recommendations of the list 240a to converge to zero over time. In turn, as the system 200a tends to become more accurate in terms of recommendations/outputs 222a generated by the system 200a over time, such increased/enhanced accuracy may tend to encourage further use/adoption of the system 200a on the part of a user community, such that the rate of convergence (in terms of accuracy) may tend to increase over time.

In some embodiments, users/subscribers may be provided an incentive for switching service (e.g., for switching from a wireline service to a fixed wireless service). Such an incentive may be embodied as a coupon, a discount code, etc. This incentive may be included as part of the outputs 222a and/or the list 240a. User/Subscriber acceptance of the incentive may be embodied in the input 244a and/or the feedback 226a, which may serve as a factor in a decision as to whether to decommission infrastructure in the user's/subscriber's area/region. Still further, in some embodiments infrastructure may be identified as being capable of being decommissioned, while at the same time being replaced by another (e.g., different) product and/or service. The product and/or service may be identified using the same data that may be used to classify a region. In this respect, aspects of the disclosure may include new/replacement product or service recommendation models that may be operative in conjunction with infrastructure detection/decommissioning models.

In some embodiments, outputs may be presented via one or more output devices, such as for example a speaker, a display device, a printer, etc. In some embodiments, one or more inputs and/or feedback may be obtained via an input device, such as for example a keyboard, a mouse, a pointer/stylus, a touchscreen, etc. In some embodiments, an input/output (I/O) device may facilitate aspects of both an input device and an output device, which is to say that an I/O device may generate/provide outputs and obtain inputs.

Figure 2B:
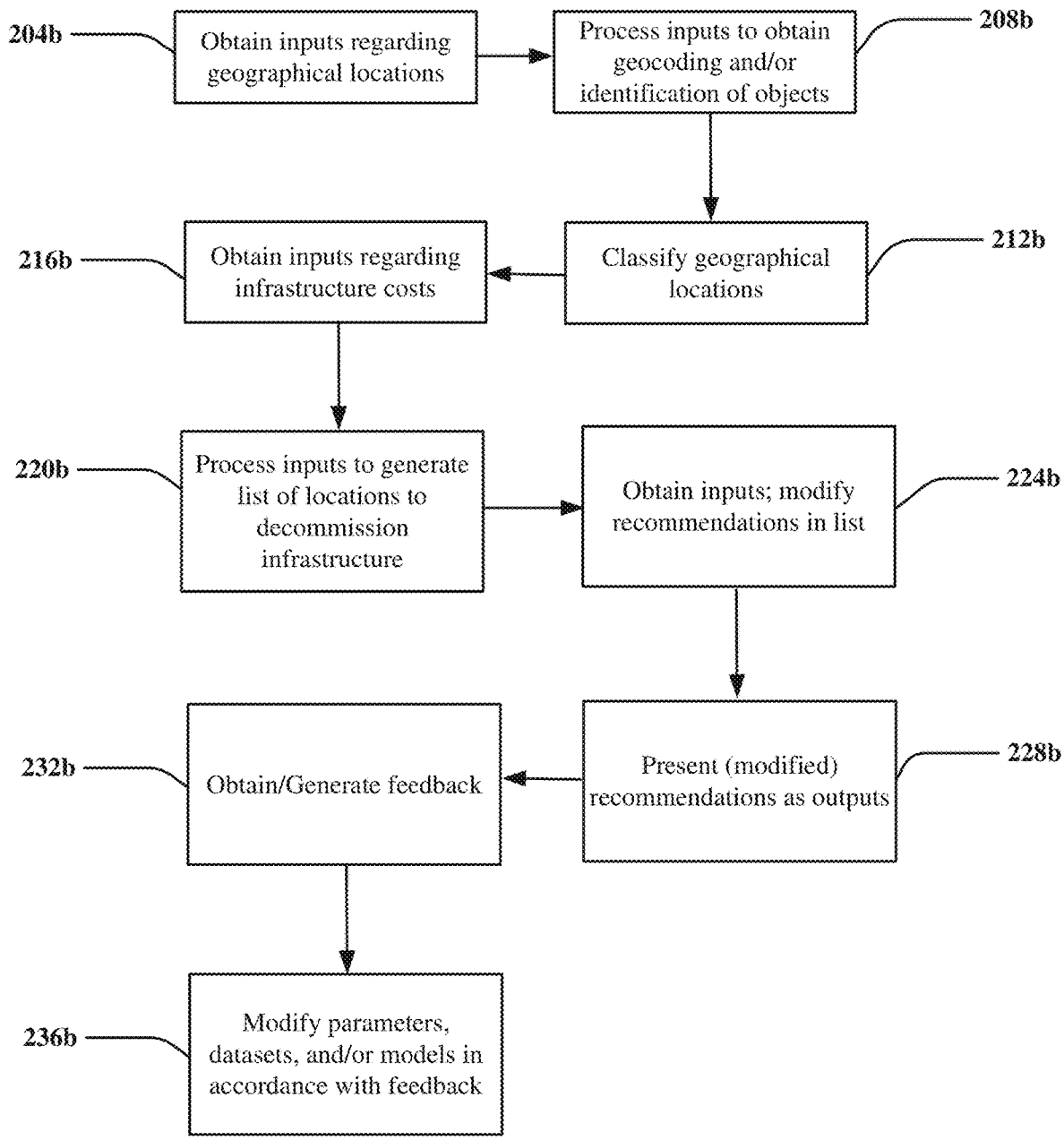
FIG. 2B depicts an illustrative embodiment of a method in accordance with various aspects described herein.

FIG. 2B depicts an illustrative embodiment of a method 200b in accordance with various aspects described herein. In some embodiments, the method 200b may be executed in conjunction with one or more of the systems, devices, and/or components described herein. Aspects of the method 200b may be used to identify and/or prioritize areas/regions that are candidates for a decommissioning of infrastructure. The method 200b may be practiced/implemented by a network operator or service provider, or a party in association (e.g., in privity) therewith.

In block 204b, inputs (e.g., inputs 218a of FIG. 2A) regarding geographical locations (e.g., areas/regions) of interest may be obtained (e.g., received). For example, the inputs of block 204b may include maps of the geographical locations. The inputs of block 204b may include imagery captured via image capture equipment and/or imagery sourced/provided via one or more networks. The inputs of block 204b may include publicly accessible data, such as for example census data, tax data, zoning data, law enforcement data, utility data (e.g., power grid data, water data, transportation data), government-issued certificates, etc.

In block 208b, the inputs of block 204b may be processed to obtain a geocoding of the geographical locations. The processing of block 208b may transform physical addresses identified in conjunction with the inputs of block 204b to locations on the Earth's surface (e.g., a spatial representation in numerical or other coordinates). Various areas/regions may be distinguished from one another on the basis of the geocodes generated in block 208b, such that the areas/regions may be (virtually) separated from one another via a geofence.

The processing of block 208b may result in an identification of objects that may be present in the imagery of block 204b. For example, the processing of the imagery performed in block 208b may identify objects that may inhibit communications (e.g., obstructions in a line-of-sight between a transmitter and a receiver in respect of wireless communications). The processing of the imagery in block 208b may identify objects that may potentially be supportive of communications (e.g., a pole or other object that may be used to mount a base station or an access point of a distributed communication system). The processing of the imagery in block 208b may identify infrastructure (e.g., poles, wires/cables, transmitters/receivers, processing equipment, etc.) that may be present in the images.

In block 212b, the geographical locations (of block 204b) may be classified, potentially on the basis of the processing of block 208b. For example, the geocodes of block 208b (potentially in conjunction with the identification of objects in block 208b) may be classified as being associated with a rural area, a suburban area, or an urban area. Other forms/grades of classification may be used in some embodiments as part of block 212b. For example, the classification of block 212b may score a geographical location on a scale of 1-10, where a score of 10 may be indicative of a densely populated area and a score of 1 may be indicative of a sparsely populated area.

In block 216b, inputs (e.g., data/information 236a of FIG. 2A) regarding actual or estimated infrastructure costs may be obtained. For example, the inputs of block 216b may be obtained from a database that reflects historical costs associated with infrastructure identified in the images as part of block 208b.

In block 220b, the inputs of block 216b may be processed in accordance with the classifications of block 212b to generate a list of recommended geographical locations for purposes of decommissioning infrastructure. For example, any costs associated with the provisioning or maintenance of the infrastructure may be weighted relative to (actual or estimated) revenue or profits generated via the infrastructure to prioritize geographical locations where infrastructure should likely be decommissioned as part of the recommendations. The list of block 220b may identify a recommended priority order for decommissioning infrastructure. The list 220b may include recommendations for replacing infrastructure with one or more products or services as described above.

In block 224b, inputs (e.g., inputs 244a of FIG. 2A) may be obtained that may modify/refine the recommendations included in the list of block 220b. The inputs of block 224b may be affirmatively provided (e.g., may be entered and/or received via a user interface of a computing device) and/or may be inferred based on an occurrence of one or more events or conditions.

In block 228b, the recommendations of block 220b (as potentially modified in block 224b) may be presented as outputs (e.g., outputs 222a of FIG. 2A). The presentation of block 228b may occur via an input/output interface and may take one or more forms, such as for example graphical displays, text, speech/audio, reports, instructions/directions, etc.

In block 232b, feedback may be generated based on the recommendations (of, e.g., block 220b and/or block 224b) and/or the outputs (e.g., outputs of block 228b). The feedback of block 232b may be based at least in part on user-provided feedback.

In block 236b, one or more parameters, datasets, and/or models may be modified/refined on the basis of the feedback of block 232b. In this regard, any error that may have been present in the recommendations (of, e.g., block 220b and/or block 224b) and/or presented outputs (of, e.g., block 228b) may tend to converge towards zero (e.g., an error-free algorithm) on the basis of the modification/refinement of block 236b. Stated slightly differently, one or more blocks (or portions thereof) of the method 200b may be executed iteratively/repeatedly, following an adaption of aspects of the blocks in accordance with the feedback of block 236b.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

While some of the examples described herein pertain to a decommissioning of infrastructure, aspects of the disclosure may be used in conjunction with a commissioning/deployment of infrastructure. For example, aspects of the disclosure may be used to identify/generate recommendations regarding areas/regions where infrastructure should be deployed, as well as identify a priority order for such deployment. Aspects of artificial intelligence/machine learning may be utilized in conjunction with such a deployment.

While some of the examples described herein pertain to infrastructure, other types of identifiable resources may be the subject of aspects of this disclosure. For example, recommendations or decisions regarding staffing or allocations of personnel may be made/generated/provided/obtained in accordance with aspects of this disclosure.

Data or information utilized as part of this disclosure may be organized/arranged as one or more datasets. In accordance with aspects of this disclosure, data may be modified/updated/refreshed in accordance with an execution of one or more algorithms or operations as described herein. In this respect, aspects of the disclosure may be operative in accordance with a most-current set of data, while still taking into consideration historical/legacy data. In some embodiments, historical/legacy data and current data may be utilized in combination with one another. In such embodiments, the historical data may be weighted relative to the current data in generating one or more outputs or results. In some embodiments, the weighting may correspond to, or be included in, one or more filtering algorithms to reduce sensitivity to spurious data points included in a dataset.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200a, and method 200b presented in FIGS. 1, 2A, and 2B. For example, virtualized communication network 300 can facilitate in whole or in part obtaining a first plurality of inputs that identify a plurality of geographical locations, wherein the first plurality of inputs includes a map, a satellite image, an aerial image, an image included on a social media platform, or any combination thereof, processing the first plurality of inputs to obtain a geocoding of the plurality of geographical locations, classifying each of the plurality of geographical locations in accordance with the geocoding to obtain a plurality of classes, obtaining a second plurality of inputs that identify costs associated with a plurality of infrastructure located at the plurality of geographical locations, processing the second plurality of inputs in conjunction with the plurality of classes to generate a list of locations included in the plurality of geographical locations to decommission infrastructure included in the plurality of infrastructure, and presenting the list, a modified list corresponding to a modification of the list, or a combination thereof, on an output device. Virtualized communication network 300 can facilitate in whole or in part obtaining a first plurality of inputs that identify a plurality of geographical locations and a plurality of infrastructure located at the plurality of geographical locations, classifying each of the plurality of geographical locations in accordance with the first plurality of inputs to obtain a plurality of classes, obtaining a second plurality of inputs that identify costs, revenue, profits, or any combination thereof, associated with the plurality of infrastructure, processing the second plurality of inputs in conjunction with the plurality of classes to identify a first plurality of locations included in the plurality of geographical locations to decommission infrastructure included in the plurality of infrastructure, and presenting the first plurality of locations via a device. Virtualized communication network 300 can facilitate in whole or in part obtaining at least one map corresponding to at least one geographical area where network infrastructure is located, processing at least the at least one map to classify the at least one geographical area, resulting in a class, identifying a cost associated with the network infrastructure in accordance with the class, determining that the network infrastructure is to be decommissioned in accordance with the cost, and generating an output that indicates that the network infrastructure is recommended to be decommissioned responsive to the determining.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
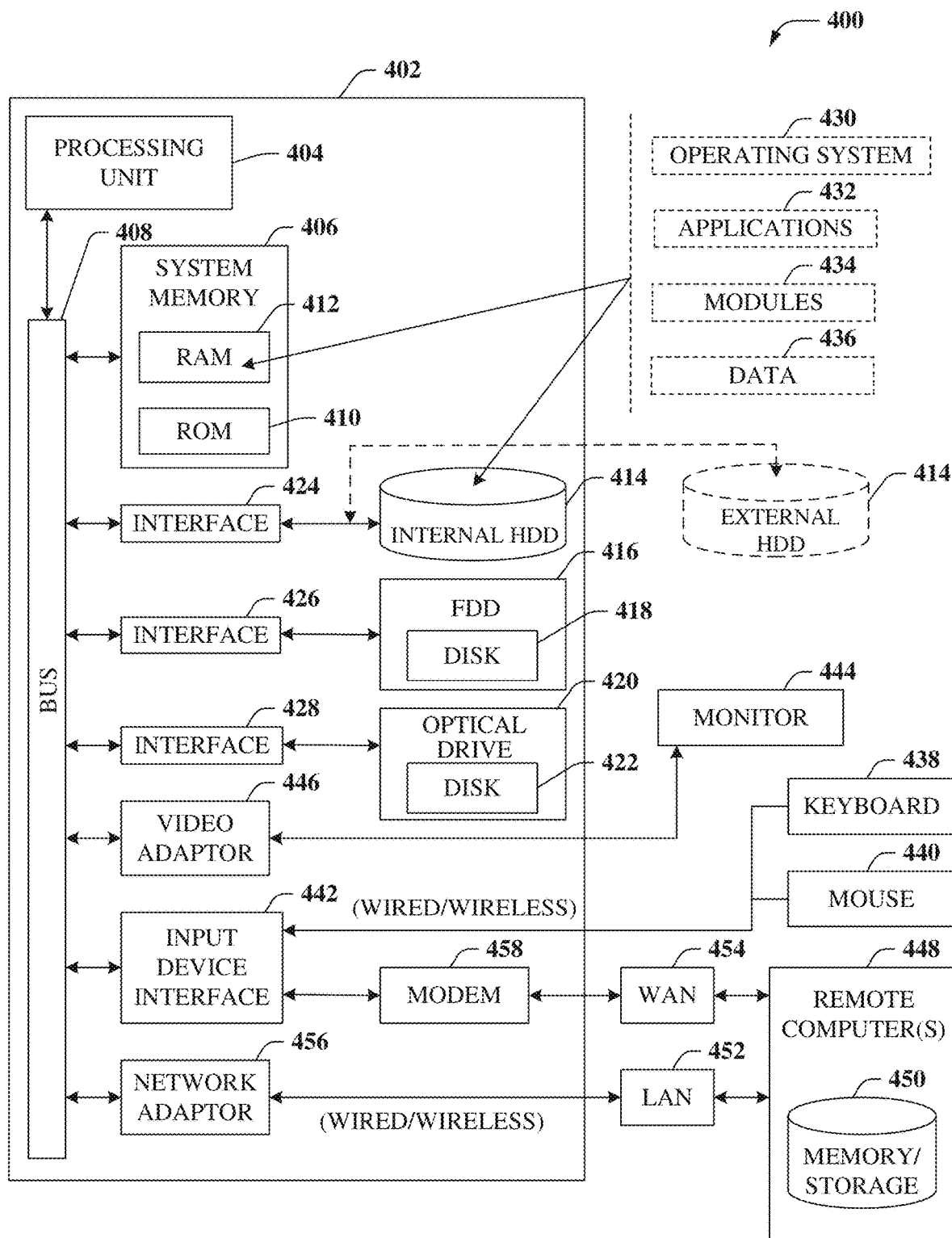
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining a first plurality of inputs that identify a plurality of geographical locations, wherein the first plurality of inputs includes a map, a satellite image, an aerial image, an image included on a social media platform, or any combination thereof, processing the first plurality of inputs to obtain a geocoding of the plurality of geographical locations, classifying each of the plurality of geographical locations in accordance with the geocoding to obtain a plurality of classes, obtaining a second plurality of inputs that identify costs associated with a plurality of infrastructure located at the plurality of geographical locations, processing the second plurality of inputs in conjunction with the plurality of classes to generate a list of locations included in the plurality of geographical locations to decommission infrastructure included in the plurality of infrastructure, and presenting the list, a modified list corresponding to a modification of the list, or a combination thereof, on an output device. Computing environment 400 can facilitate in whole or in part obtaining a first plurality of inputs that identify a plurality of geographical locations and a plurality of infrastructure located at the plurality of geographical locations, classifying each of the plurality of geographical locations in accordance with the first plurality of inputs to obtain a plurality of classes, obtaining a second plurality of inputs that identify costs, revenue, profits, or any combination thereof, associated with the plurality of infrastructure, processing the second plurality of inputs in conjunction with the plurality of classes to identify a first plurality of locations included in the plurality of geographical locations to decommission infrastructure included in the plurality of infrastructure, and presenting the first plurality of locations via a device. Computing environment 400 can facilitate in whole or in part obtaining at least one map corresponding to at least one geographical area where network infrastructure is located, processing at least the at least one map to classify the at least one geographical area, resulting in a class, identifying a cost associated with the network infrastructure in accordance with the class, determining that the network infrastructure is to be decommissioned in accordance with the cost, and generating an output that indicates that the network infrastructure is recommended to be decommissioned responsive to the determining.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
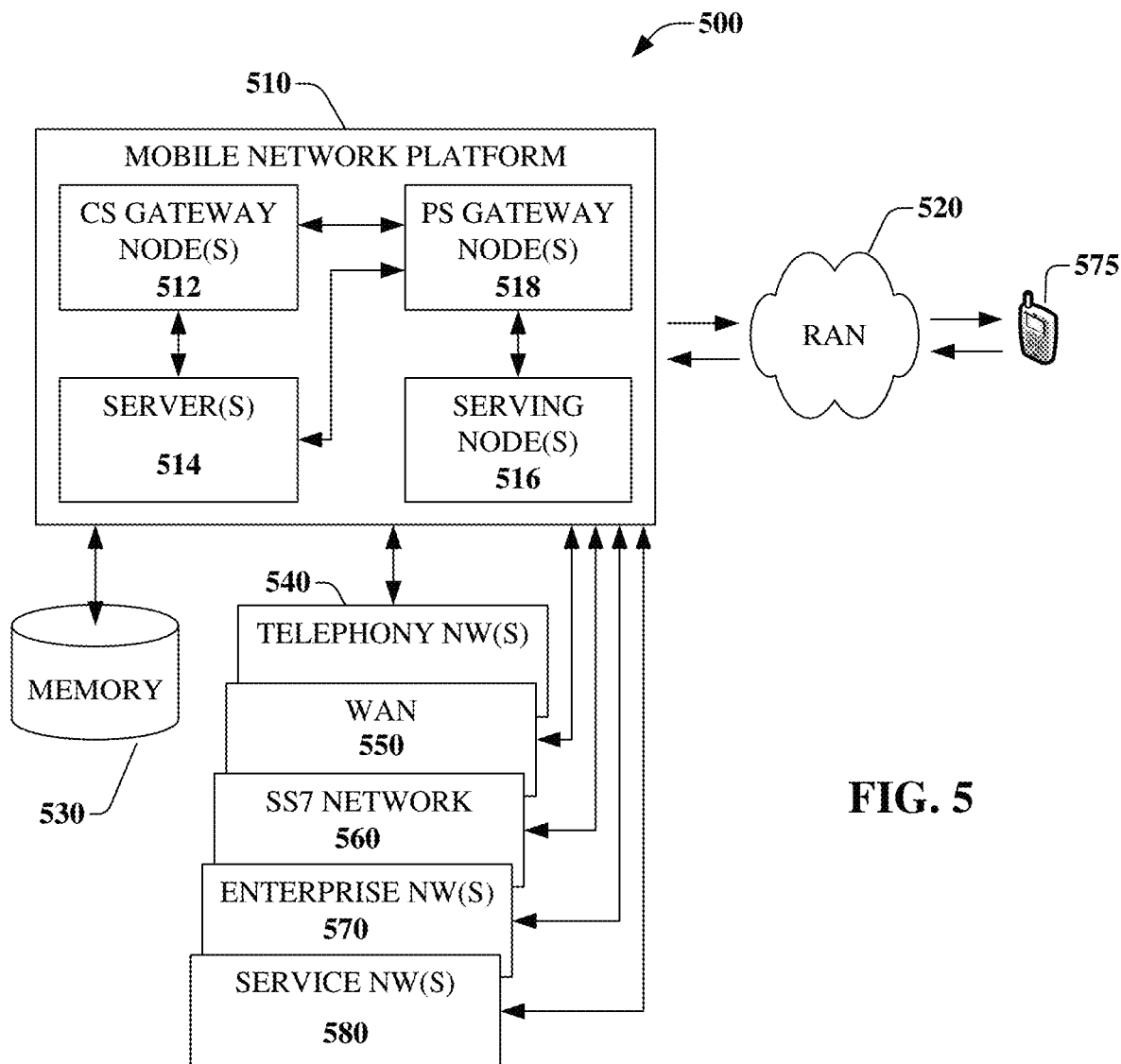
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining a first plurality of inputs that identify a plurality of geographical locations, wherein the first plurality of inputs includes a map, a satellite image, an aerial image, an image included on a social media platform, or any combination thereof, processing the first plurality of inputs to obtain a geocoding of the plurality of geographical locations, classifying each of the plurality of geographical locations in accordance with the geocoding to obtain a plurality of classes, obtaining a second plurality of inputs that identify costs associated with a plurality of infrastructure located at the plurality of geographical locations, processing the second plurality of inputs in conjunction with the plurality of classes to generate a list of locations included in the plurality of geographical locations to decommission infrastructure included in the plurality of infrastructure, and presenting the list, a modified list corresponding to a modification of the list, or a combination thereof, on an output device. Platform 510 can facilitate in whole or in part obtaining a first plurality of inputs that identify a plurality of geographical locations and a plurality of infrastructure located at the plurality of geographical locations, classifying each of the plurality of geographical locations in accordance with the first plurality of inputs to obtain a plurality of classes, obtaining a second plurality of inputs that identify costs, revenue, profits, or any combination thereof, associated with the plurality of infrastructure, processing the second plurality of inputs in conjunction with the plurality of classes to identify a first plurality of locations included in the plurality of geographical locations to decommission infrastructure included in the plurality of infrastructure, and presenting the first plurality of locations via a device. Platform 510 can facilitate in whole or in part obtaining at least one map corresponding to at least one geographical area where network infrastructure is located, processing at least the at least one map to classify the at least one geographical area, resulting in a class, identifying a cost associated with the network infrastructure in accordance with the class, determining that the network infrastructure is to be decommissioned in accordance with the cost, and generating an output that indicates that the network infrastructure is recommended to be decommissioned responsive to the determining.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
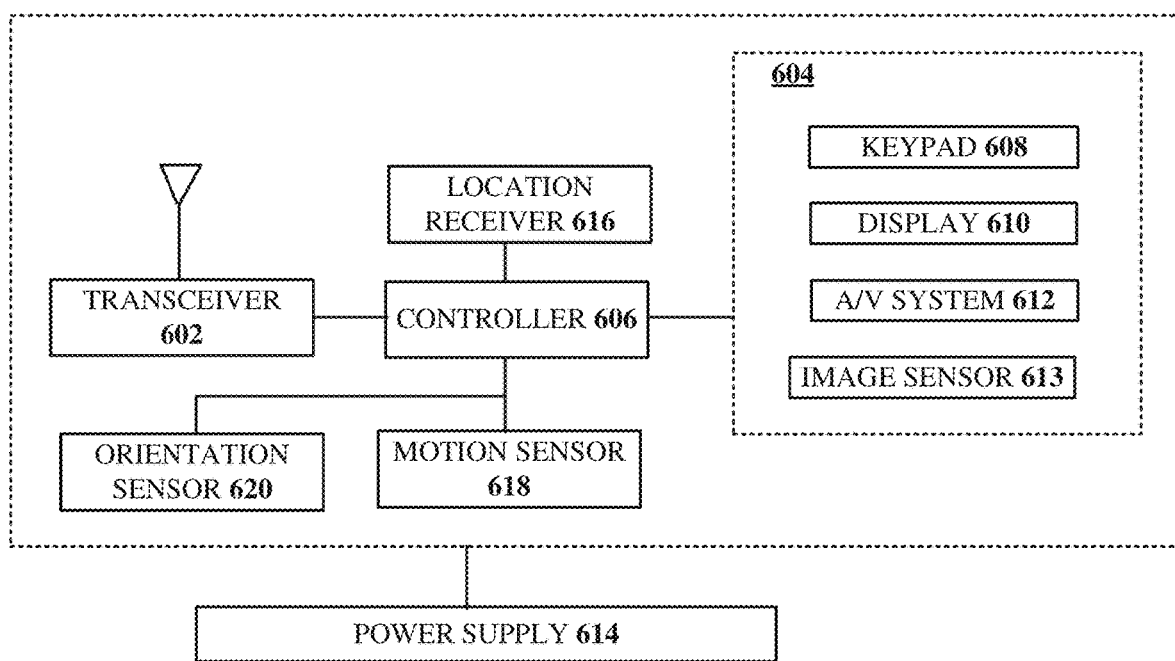
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining a first plurality of inputs that identify a plurality of geographical locations, wherein the first plurality of inputs includes a map, a satellite image, an aerial image, an image included on a social media platform, or any combination thereof, processing the first plurality of inputs to obtain a geocoding of the plurality of geographical locations, classifying each of the plurality of geographical locations in accordance with the geocoding to obtain a plurality of classes, obtaining a second plurality of inputs that identify costs associated with a plurality of infrastructure located at the plurality of geographical locations, processing the second plurality of inputs in conjunction with the plurality of classes to generate a list of locations included in the plurality of geographical locations to decommission infrastructure included in the plurality of infrastructure, and presenting the list, a modified list corresponding to a modification of the list, or a combination thereof, on an output device. Computing device 600 can facilitate in whole or in part obtaining a first plurality of inputs that identify a plurality of geographical locations and a plurality of infrastructure located at the plurality of geographical locations, classifying each of the plurality of geographical locations in accordance with the first plurality of inputs to obtain a plurality of classes, obtaining a second plurality of inputs that identify costs, revenue, profits, or any combination thereof, associated with the plurality of infrastructure, processing the second plurality of inputs in conjunction with the plurality of classes to identify a first plurality of locations included in the plurality of geographical locations to decommission infrastructure included in the plurality of infrastructure, and presenting the first plurality of locations via a device. Computing device 600 can facilitate in whole or in part obtaining at least one map corresponding to at least one geographical area where network infrastructure is located, processing at least the at least one map to classify the at least one geographical area, resulting in a class, identifying a cost associated with the network infrastructure in accordance with the class, determining that the network infrastructure is to be decommissioned in accordance with the cost, and generating an output that indicates that the network infrastructure is recommended to be decommissioned responsive to the determining.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
 a processing system including a processor; and
 a memory that stores executable instructions that, when executed by the processing system, facilitate performance of operations, the operations comprising:
  classifying each of a plurality of geographical locations in accordance with a geocoding of the plurality of geographical locations to obtain a plurality of classes;
  obtaining a plurality of inputs that identify costs associated with a plurality of infrastructure located at the plurality of geographical locations;
  processing the plurality of inputs in conjunction with the plurality of classes to generate a list of locations included in the plurality of geographical locations to decommission infrastructure included in the plurality of infrastructure; and
  presenting the list, a modified list corresponding to a modification of the list, or a combination thereof, on an output device.

2. The device of claim 1, wherein the obtaining of the plurality of inputs is based on the plurality of infrastructure.

3. The device of claim 1, wherein the classifying comprises applying the geocoding to at least one model, and wherein the operations further comprise:
 generating feedback regarding the list, the modified list, or the combination thereof; and modifying, in accordance with the feedback, the at least one model, at least one input included in the plurality of inputs, or a combination thereof.

4. The device of claim 1, wherein the plurality of classes includes a first class corresponding to a rural area, a second class corresponding to a suburban area, a third class corresponding to an urban area, or any combination thereof.

5. The device of claim 1, wherein the plurality of geographical locations is identified from census data, tax data, zoning data, law enforcement data, utility data, a government-issued certificate, or any combination thereof.

6. The device of claim 1, wherein the plurality of geographical locations is identified from a plurality of subscribers of: a network operator, a service provider, or a combination thereof.

7. The device of claim 1, wherein the operations further comprise:
receiving a modification to the list in accordance with a user-generated input, resulting in the modified list,
wherein the presenting of the list, the modified list, or the combination thereof includes presenting the modified list.

8. The device of claim 7, wherein the receiving of the modification to the list includes receiving a credential, and wherein the operations further comprise:
verifying the credential; and
generating the modified list responsive to the verifying of the credential.

9. The device of claim 1, wherein the presenting of the list, the modified list, or the combination thereof includes presenting the locations included in the plurality of geographical locations with special effects overlaid on representations of the locations on a map.

10. The device of claim 9, wherein the special effects include highlighting, color-coding, an indication of a numerical ranking, a shape, a symbol, or any combination thereof.

11. The device of claim 1, wherein the output device includes a speaker, a display device, a printer, or any combination thereof.

12. A non-transitory, machine-readable medium, comprising executable instructions that, when executed by a processing system including a processor, facilitate performance of operations, the operations comprising:
classifying each of a plurality of geographical locations in accordance with a geocoding of the plurality of geographical locations to obtain a plurality of classes;
obtaining a plurality of inputs that identify costs associated with a plurality of infrastructure located at the plurality of geographical locations;
processing the plurality of inputs in conjunction with the plurality of classes to generate a list of locations included in the plurality of geographical locations to decommission infrastructure included in the plurality of infrastructure; and
presenting the list, a modified list corresponding to a modification of the list, or a combination thereof, on a device.

13. The non-transitory, machine-readable medium of claim 12, wherein the operations further comprise:
presenting, via the device, instructions, a tutorial, or a combination thereof,
wherein the instructions, the tutorial, or the combination thereof identifies a tool required to decommission the infrastructure, a technique used to decommission the infrastructure, or a combination thereof.

14. The non-transitory, machine-readable medium of claim 12, wherein the classifying occurs in accordance with a model, and wherein the operations further comprise:
obtaining feedback from the device; and
modifying the model in accordance with the feedback to obtain a modified model.

15. The non-transitory, machine-readable medium of claim 14, wherein the operations further comprise:
obtaining a second plurality of inputs that identify a second plurality of geographical locations and a second plurality of infrastructure located at the second plurality of geographical locations;
classifying each of the second plurality of geographical locations in accordance with the second plurality of inputs and the modified model to obtain a second plurality of classes;
obtaining a third plurality of inputs that identify second costs associated with the second plurality of infrastructure;
processing the third plurality of inputs in conjunction with the second plurality of classes to identify a second plurality of locations included in the second plurality of geographical locations to decommission second infrastructure included in the second plurality of infrastructure; and
presenting the second plurality of locations via the device.

16. The non-transitory, machine-readable medium of claim 12, wherein the classifying of each of the plurality of geographical locations assigns a score to each of the plurality of geographical locations, and wherein a respective score for a given geographical location included in the plurality of geographical locations is based at least in part on a population density of the given geographical location.

17. A method, comprising:
classifying, by a processing system including a processor, each of a plurality of geographical areas in accordance with a geocoding of the plurality of geographical areas to obtain a plurality of classes;
obtaining, by the processing system, a plurality of inputs that identify costs associated with a plurality of network infrastructure located at the plurality of geographical areas;
processing, by the processing system, the plurality of inputs in conjunction with the plurality of classes to generate a list of locations included in the plurality of geographical areas to decommission network infrastructure included in the plurality of network infrastructure; and
outputting, by the processing system, the list, a modified list corresponding to a modification of the list, or a combination thereof, on an output device.

18. The method of claim 17, wherein the outputting includes an identification of a product, a service, or a combination thereof, to replace the network infrastructure.

19. The method of claim 17, further comprising:
obtaining, by the processing system, at least one image corresponding to at least one geographical area of the plurality of geographical areas, wherein a class in the plurality of classes is based in part on a processing of the at least one image; and
identifying, by the processing system, the network infrastructure in the at least one image in accordance with the processing of the at least one image.

20. The method of claim 19, wherein the processing of the at least one image occurs in accordance with a model, the method further comprising:

obtaining, by the processing system, feedback regarding the outputting;

modifying, by the processing system, the model in accordance with the feedback, resulting in a modified model;

classifying, by the processing system, at least one geographical area in accordance with the modified model, resulting in a modified class that is different from the class;

identifying, by the processing system, a second cost associated with a second network infrastructure located at the at least one geographical area in accordance with the modified class;

determining, by the processing system, that the second network infrastructure is to be decommissioned in accordance with the second cost; and generating, by the processing system, a second output that indicates that the second network infrastructure is recommended to be decommissioned responsive to the determining that the second network infrastructure is to be decommissioned.

* * * * *